Figure 1:
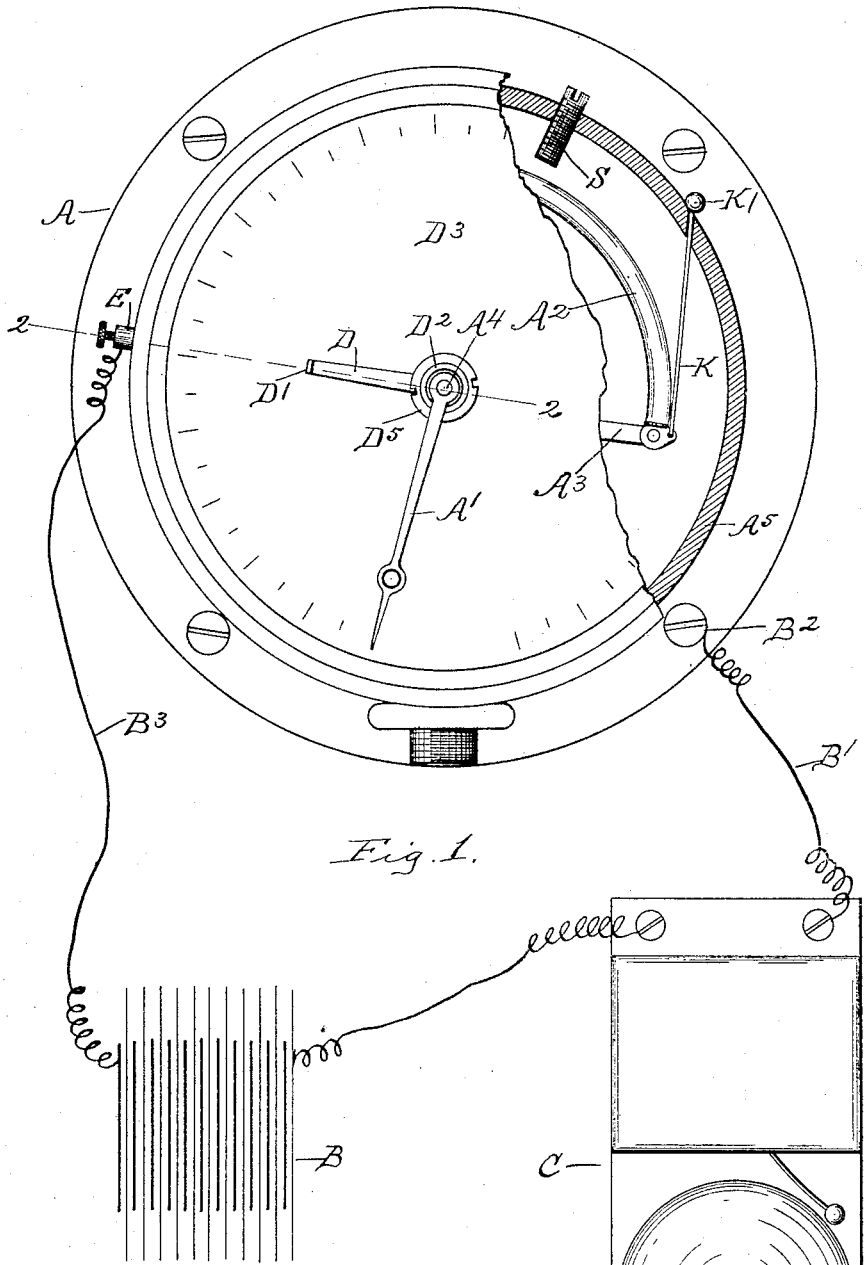

(No Model.) 2 Sheets—Sheet 1.

W. H. BRADT.
ALARM GAGE TESTING MECHANISM.

No. 534,311. Patented Feb. 19, 1895.

Witnesses:
A. E. Delaney
J. A. Rouse

Inventor:
William H. Bradt,
by Mosher & Curtis
attys.

(No Model.) 2 Sheets—Sheet 2.
W. H. BRADT.
ALARM GAGE TESTING MECHANISM.
No. 534,311. Patented Feb. 19, 1895.
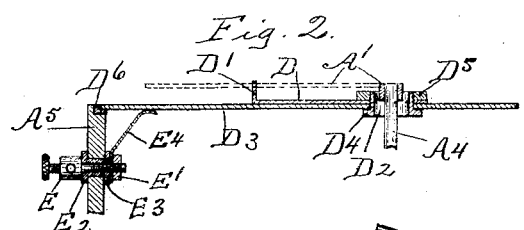
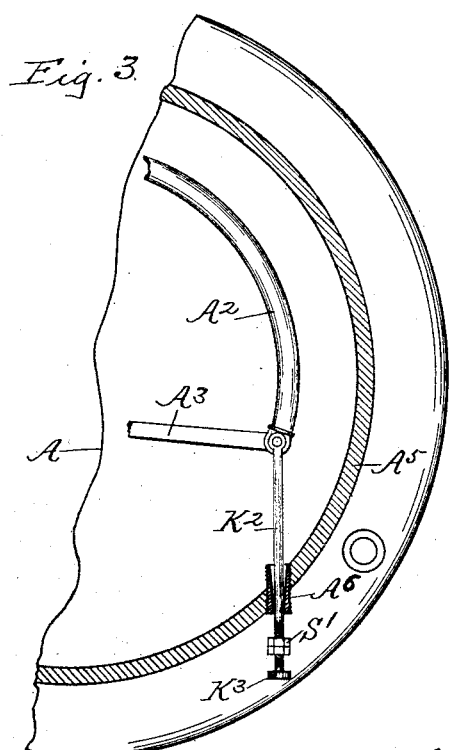
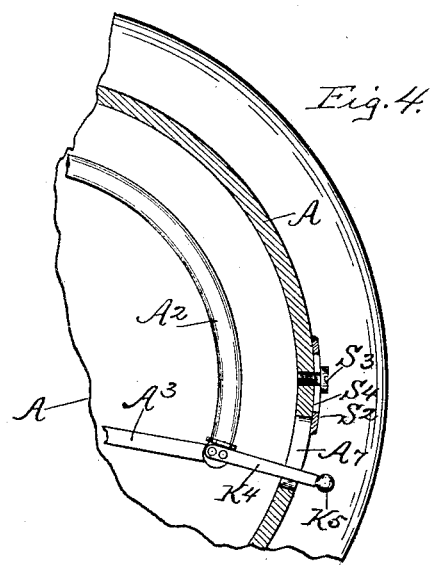
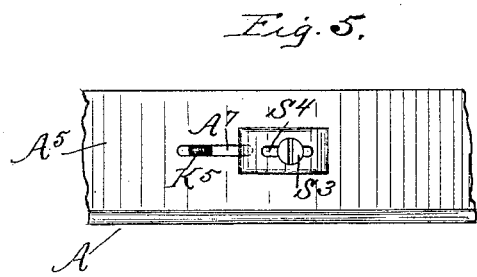
Witnesses:
A. E. Delaney
J. A. Rouse
Inventor:
William H. Bradt
by Mosher & Curtis
Attys.

UNITED STATES PATENT OFFICE.

WILLIAM H. BRADT, OF TROY, NEW YORK.

ALARM-GAGE TESTING MECHANISM.

SPECIFICATION forming part of Letters Patent No. 534,311, dated February 19, 1895.

Application filed February 10, 1894. Serial No. 499,743. (No model.)

*To all whom it may concern:*

Be it known that I, WILLIAM H. BRADT, a citizen of the United States, residing at Troy, county of Rensselaer, and State of New York, have invented certain new and useful Improvements in Alarm-Gage Testing Mechanism, of which the following is a specification.

My invention relates to such improvements and consists of the novel construction and combination of parts hereinafter described and subsequently claimed.

Reference may be had to the accompanying drawings, and the letters of reference marked thereon, which form a part of this specification.

Similar letters refer to similar parts in the several figures therein.

Figure 1 of the drawings is a front view of an alarm gage provided with my improved testing mechanism. Fig. 2 is a cross-section of same taken on the broken line 2—2, in Fig. 1. Figs. 3 and 4 are views partly in section of a portion of a gage having different forms of testing mechanism. Fig. 5 is a side elevation of the device shown in Fig. 4.

The objects of my invention are to provide an alarm-gage with mechanism for testing the contact of the circuit-closing electrodes and the operation of the battery circuit; and for preventing injury to the gage by the use of such mechanism.

Referring to the drawings, A— represents a well known form of pressure-gage having an index A'— operated by a Bourden tube $A^2$— and intermediate links and levers in the usual manner, a portion of the tube and one of the links $A^3$— being shown in Fig. 1.

B— is an electric battery which may be of any known form; and C— is an electro-magnetic signal bell located in the battery-circuit. A line-wire B'— connects one pole of the battery with the gage-case at $B^2$— and, with the case and index-pinion $A^4$—, forms a continuous connection between the battery and the index, the index forming the movable electrode of the circuit-closing mechanism. The other electrode is formed by the contact-hand D— insulated from the index and having its end offset to form a contact-finger D'— in the path of the index. The contact-hand is pivoted concentrically with the index upon a sleeve $D^2$— inserted in the central aperture in the dial $D^3$— surrounding the index-shaft. The sleeve is provided on its inner end with a shoulder $D^4$— abutting on the under side of the dial, and its upper outer end is screw-threaded to receive and fit the similarly threaded clamping-nut $D^5$— by means of which the contact-hand is securely clamped to the dial. The dial, with its contact-hand secured thereto, is insulated from the case of the gage and the index in any known manner as by means of the washer $D^6$— of rubber or other insulating material between the dial and case.

A binding-post E—, is secured in an aperture in the case wall $A^5$ by the nut E'— on its inner end, the post and nut being insulated from the case by the insulating sleeve $E^2$— and washer $E^3$—. The inner end of the post is connected by the conductor $E^4$— with the dial, and the outer end by line-wire $B^3$— with the remaining pole of the battery, whereby the contact-hand D— is connected through the dial and intervening conductors with such pole of the battery and forms the fixed electrode of the circuit-closing mechanism. By loosening the clamping-nut $D^5$— the contact hand may be adjusted on the sleeve to assume any position radial to the dial, whereby the alarm can be operated when the pressure reaches any predetermined limit, high or low.

The failure of alarm-gages to operate at critical times is due frequently to the failure of the battery-current; and often to the electrodes becoming corroded or coated with oil, dust or other matter which prevents the contact of the electrodes. The latter is frequently the case when the gage-pressure reaches the alarm limit at infrequent intervals.

I have shown in the drawings a device which can be applied to an alarm-gage, by means of which the electrodes can be brought into contact at frequent intervals to close the circuit for testing the battery, and remove and prevent any accumulation of dust or other substance upon the electrodes.

K— is a link connected at its opposite ends with the vibratory end of the Bourden-tube interiorly of the case, and with the handle K'— exteriorly of the case, the link passing through an aperture in the case-wall and being freely movable therethrough. The link may be rigid or flexible, and forms a connection between the handle and index-operating mechanism whereby such mechanism can be moved or operated by the handle. A sufficient movement can thus be imparted to such mechanism to cause the index to indicate the alarm degree of pressure and thereby bring the electrodes into contact, whereupon the alarm will be sounded if the apparatus is in working order. By having the link freely movable through the case-wall aperture the link is free to respond to the movements of the tube under varying degrees of interval pressure, whereby a rigid link may be employed, if desired, and may be connected with the tube without injury to the tube or interference with its operation.

As a means for preventing a straining movement of the parts after the electrodes have been brought into contact by the testing mechanism above described, I provide a stop for the testing mechanism consisting of a screw S— inserted in a threaded aperture in the case-wall to project interiorly of the case in the path of the Bourden tube. The stop can be adjusted to engage the tube when the latter has moved sufficiently to cause a contact of the electrodes. The stop will thus prevent further movement which would tend to break or loosen the index and to strain the tube.

By the use of a stop for the testing mechanism, injury to the gage will be prevented at the hand of an inexperienced operator.

The exact form and location of the testing device and stop are immaterial, as any hand-mechanism operative from without the case and freely movable through an aperture in the case-wall to cause a contact of the electrodes may be employed; and the stop may act to directly limit the movement of any part of the testing mechanism.

In Fig. 3 I have shown the hand-mechanism in the form of a rigid link $K^2$— pivotally secured at its inner end to the Bourden tube, and having the handle or head $K^3$— located without the case. The link is freely movable through the bushing $A^6$— inserted in the case-wall aperture; and is screw-threaded near its outer end to receive and fit the stop-nut $S'$— which engages the end of the bushing $A^6$— to serve as a stop for the testing mechanism.

In Fig. 4 the hand-mechanism for testing the gage consists of a bar $K^4$— fixed upon the Bourden tube and freely movable through a slot $A^7$— in the case-wall. The projecting end of the bar forms a handle $K^5$— for operating the testing mechanism. A slotted-plate $S^2$— is secured to the outer side of the case-wall by the screw $S^3$— in the path of the bar $K^4$— and serves as a stop for the testing mechanism. The screw passes through the slot $S^4$— in the stop-plate, and the plate can be easily adjusted by loosening the screw.

The testing mechanism and stop therefor are adapted for use in various forms of alarm-gage in which an alarm is given when the pressure reaches a predetermined limit, high or low.

What I claim as new, and desire to secure by Letters Patent, is—

1. In an alarm-gage, having electrodes arranged to be brought into contact by the movement of the index-operating mechanism, the combination with the index-operating mechanism, and apertured case-wall of the gage, of a handle accessible from without the case, and a handle-connection positively joined to the index-operating mechanism and having a movement of translation with reference to the case-wall, substantially as described.

2. In an alarm-gage having electrodes arranged to be brought into contact by the movement of the index-operating mechanism, the combination with the index-operating mechanism, and apertured case-wall of the gage, of a handle accessible from without the case, and a link-connection between the handle and index-operating mechanism freely movable through the case-wall aperture, substantially as described.

In testimony whereof I have hereunto set my hand this 8th day of February, 1894.

WM. H. BRADT.

Witnesses:
 FRANK C. CURTIS,
 A. E. DELANEY.